(12) United States Patent
Wakim et al.

(10) Patent No.: US 7,729,987 B1
(45) Date of Patent: Jun. 1, 2010

(54) ENHANCED DEMAND DEPOSIT ACCOUNTS

(75) Inventors: Linda Wakim, Bridgeville, PA (US);
Alan Trivilino, Pittsburgh, PA (US);
Richard Claypoole, Hoover, AL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 11/647,034

(22) Filed: Dec. 28, 2006

Related U.S. Application Data

(63) Continuation of application No. 11/415,812, filed on May 2, 2006, now abandoned.

(60) Provisional application No. 60/676,831, filed on May 2, 2005.

(51) Int. Cl.
*G06Q 40/00* (2006.01)
(52) U.S. Cl. .................... 705/42; 705/35; 705/37; 705/38; 705/39
(58) Field of Classification Search .............. None
See application file for complete search history.

(56) References Cited

U.S. PATENT DOCUMENTS 5,893,078 A * 4/1999 Paulson .................. 705/35
5,933,817 A * 8/1999 Hucal ..................... 705/39
2006/0106693 A1* 5/2006 Carlson et al. ........... 705/35
2006/0212385 A2* 9/2006 Bent et al. ............... 705/38

OTHER PUBLICATIONS

ETRADE.com <URL: http://www.etrade.com> [online], Apr. 4, 2000 [retrieved on Nov. 7, 2007]. Retrieved from the Internet: <URL: http://www.archive.org>.*
Proquest, PR Newswire—New York; Journal Abstract (Summary/Full Articel) [online], Apr. 4, 2000 [retrieved on Nov. 7, 2007]. Retrieved from the Internet: <URL: http://www.proquest.com>.*
Proquest, Christian Science Monitor—Boston; Journal Abstract (Summary/Full Articel) [online], Feb. 4, 2002 [retrieved on Nov. 7, 2007]. Retrieved from the Internet: <URL: http://www.proquest.com>.*
Barron's Financial Guides Dictionary of Finance and Investment Terms Barron's 1998. p. 144.*

* cited by examiner

*Primary Examiner*—Kambiz Abdi
*Assistant Examiner*—Benjamin S Fields
(74) *Attorney, Agent, or Firm*—K&L Gates LLP

(57) ABSTRACT

A method for adjusting a demand deposit account. The method may comprise the step of structuring the demand deposit account with at least a first balance tier and a second balance tier. The methods may also comprise the steps of monitoring a balance of the demand deposit account, and accruing interest to at least a portion of the balance of the demand deposit account at an interest rate if the balance falls within the second balance tier. The interest rate may be tied to an interest rate of an investment account.

8 Claims, 3 Drawing Sheets

ENHANCED DEMAND DEPOSIT ACCOUNTS

CROSS-REFERENCE TO RELATED APPLICATION

This application is a continuation of U.S. application Ser. No. 11/415,812 filed on May 2, 2006, which claims the benefit of U.S. Provisional Application No. 60/676,831 filed on May 2, 2005, which is incorporated herein by reference.

BACKGROUND

Depositors who need ready access to deposited funds often utilize demand deposit accounts (DDA's) such as checking accounts. Although DDA's allow relatively unfettered access to funds, they also have significant shortcomings. The return on funds kept in DDA's is often limited because many DDA's pay little or no interest on account balances. Also, financial institutions are limited in the way that they can use funds deposited in DDA's because of the associated liquidity risk: a depositor may have the right to remove any or all of the deposited funds at any time to pay for a transaction, or for any other reason. Moreover, the low interest rate paid on a typical DDA does not create a significant incentive for the depositor to keep funds in the DDA. From the standpoint of the financial institution, this makes the balances of DDA's highly liquid. Therefore, financial institutions are often prevented from using DDA deposited funds in longer term investments, and thereby lose the opportunity to pursue the potential return that such investments might provide.

The problems associated with DDA's often force depositors who want to earn a higher interest rate to transfer funds from a DDA to a higher interest-bearing account when the funds are not needed in the DDA to cover transactions. This approach, however, only creates additional difficulties. It can be appreciated that a considerable degree of cash flow management is required on the part of the depositor to calculate what portion of an account balance may be transferred at any given time and to move that balance between accounts. In addition, mistakenly calculating the required balance in the DDA, or not transferring sufficient funds from the higher interest-bearing account back into the DDA, may cause costly overdrafts on the DDA.

Many banks automate fund transfers by offering sweep accounts, however, these accounts also present their own problems. Typically, a sweep account includes two physical accounts, a DDA and an associated investment account (e.g., a money market account). After all daily transactions have cleared the DDA, some portion of its remaining balance is transferred to the investment account where the funds may earn interest until the opening of the next business day. At that time, the funds are transferred back to the DDA. It will be appreciated that it requires substantial administrative resources and information technology infrastructure to maintain two accounts and transfer balances, as in a sweep account. Also, with many existing sweep accounts, one or both of the DDA and the investment account are not insured by the Federal Deposit Insurance Corporation (FDIC) or another insurance provider, thereby increasing the depositor's financial risk.

Accordingly, in view of the problems described above, there is a need for a DDA that can be structured to potentially increase depositor returns while reducing the liquidity risks for financial institutions that offer the DDA.

BRIEF DESCRIPTION OF THE DRAWINGS

Further advantages of the present invention may be better understood by referring to the following description taken in conjunction with the accompanying drawings, in which.

DESCRIPTION

As applied herein to embodiments of the invention, the term "financial institution" may refer to any entity or institution that offers a demand deposit account (DDA). Examples of financial institutions may include banks, credit unions, savings and loan companies, or any other entity capable of offering, maintaining or managing a DDA.

Also, as applied herein, the term "depositor" may refer to any entity accessing, using, or holding a DDA with a financial institution. Depositors may include, for example, individuals, groups of individuals, business entities, or other entities.

Figure 1:
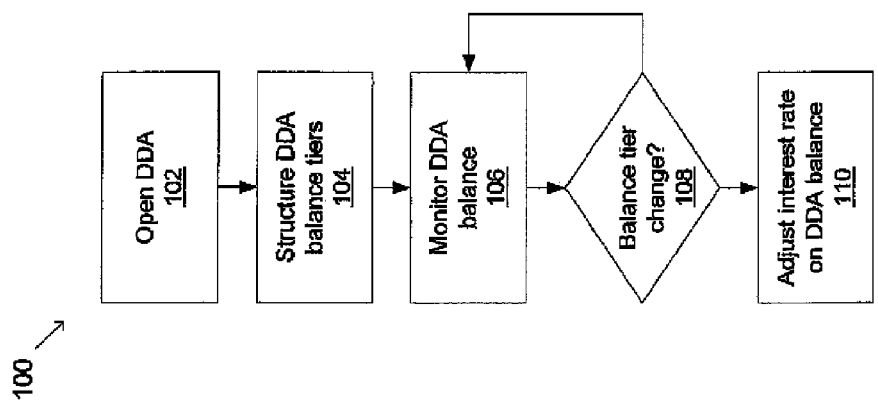
FIG. 1 is a diagram illustrating a process flow according to various embodiments of the present invention.
Figure 2:
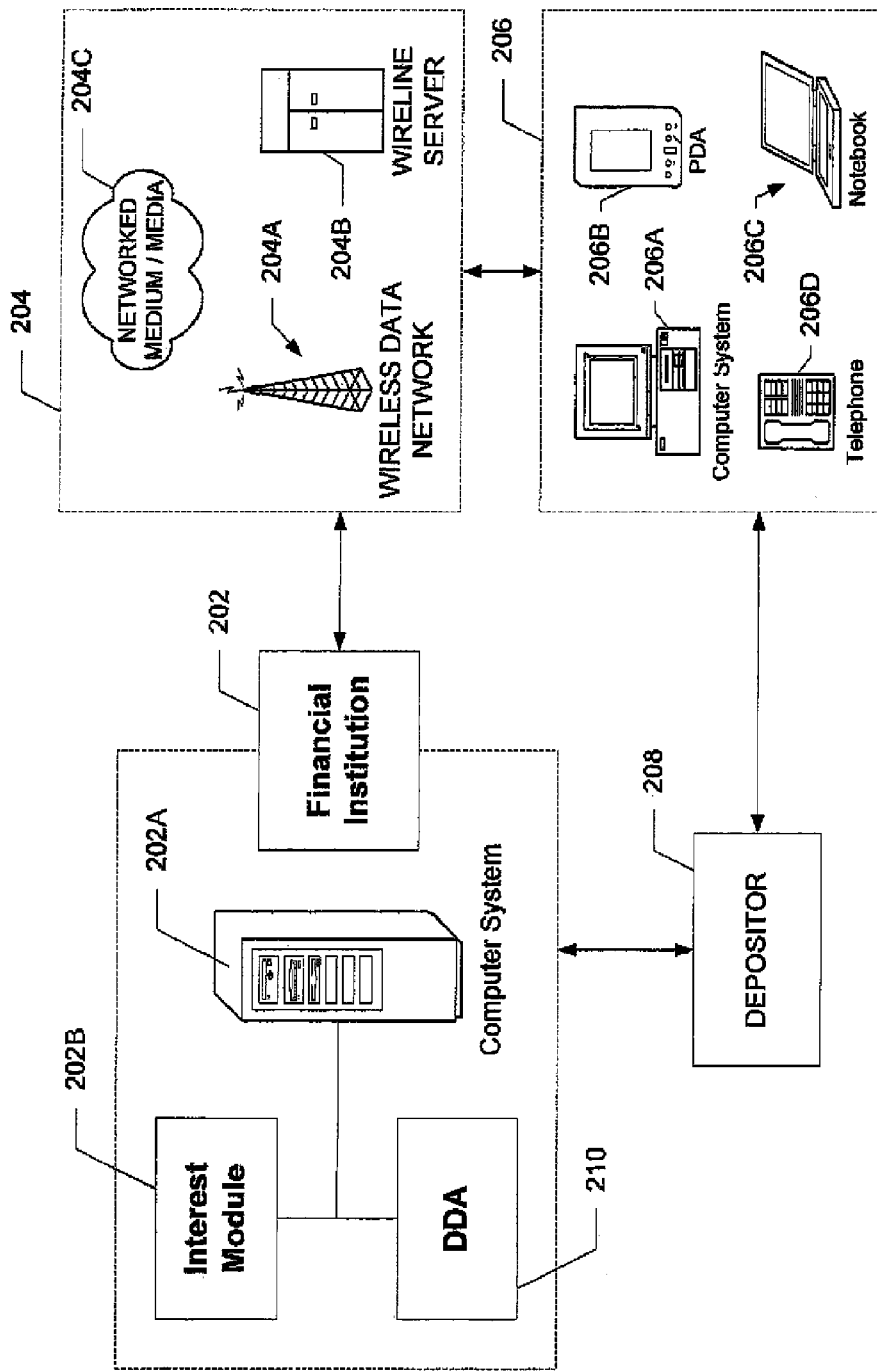
FIG. 2 is a diagram illustrating a system according to various embodiments of the present invention.

Referring now to FIGS. 1 and 2, example embodiments of the present invention are provided. At step 102 of process flow 100 shown in FIG. 1, a depositor 208 may open a DDA 210 with a financial institution 202. The DDA 210 may be offered to depositor 208, under various conventional terms agreed upon by the depositor 208 and the financial institution 202. In various embodiments of the invention, the depositor 208 may be required to pay a periodic fee to financial institution 202, such as a monthly fee, for providing and maintaining the DDA 210. Also, in various embodiments, the depositor 208 may be required to maintain a minimum balance in the DDA 210. For example, the depositor 208 may be required to pay a monthly fee if the balance of the DDA 210 drops below the minimum balance. In various embodiments of the invention, the DDA 210 may be covered by the FDIC or another suitable insurance provider.

Figure 3:
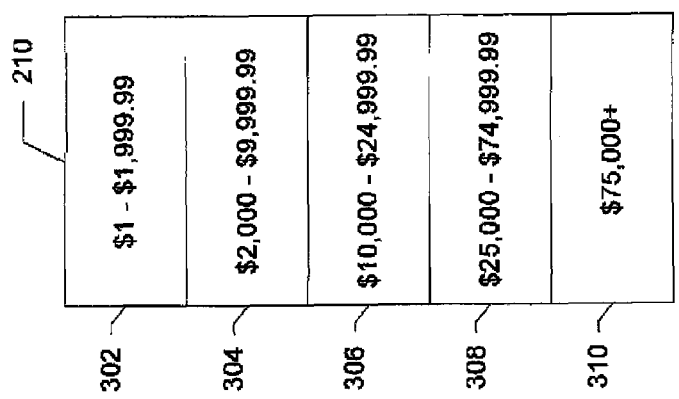
FIG. 3 is a diagram illustrating a structure of a demand deposit account (DDA) according to various embodiments of the present invention.

At step 104, the DDA 210 may be structured to include two or more balance tiers. FIG. 3 shows a DDA 210 structured to include an exemplary set of balance tiers 302, 304, 306, 308, 310 according to various embodiments of the invention. The transition point between two balance tiers may be referred to as a threshold amount. For example, the threshold amount between balance tier 302 and balance tier 304 is $2,000. It will be appreciated that the DDA 210 may be divided into two or more balance tiers as desired, with the threshold amounts between balance tiers set at any suitable value or values based on factors including, for example, the net worth of the depositor 208, the financial objectives of the financial institution 202 and/or other factors. For example, the threshold amount between a first and a second balance tier may be $25,000.

Each balance tier 302, 304, 306, 308, 310 may correspond to an interest rate paid on the DDA 210. In various embodiments of the invention, higher balance tiers may correspond to higher interest rates. For example, balance tier 302 may correspond to a first interest rate and balance tier 304 may correspond to a second interest rate slightly higher than the first and so forth. In various embodiments of the invention, the interest rate corresponding to a first balance tier, for example, balance tier 302, may be 0%, meaning that the depositor 208 may be required to deposit a balance in the DDA 210 greater than the threshold between balance tier 302 and balance tier 304 to earn any interest.

The interest rates corresponding to various balance tiers may be any interest rates agreed upon between the financial institution 202 and the depositor 208, and may be static or dynamic rates. In various embodiments of the invention, the interest rates corresponding to one or more balance tiers may be tied to an interest rate paid on another financial product. For example, the interest rates corresponding to balance tiers may be equal to those of the financial product, or equal to those of the financial product plus or minus a predetermined number of basis points. For example, the interest rate corresponding to a balance tier may be tied to a rate paid on: a savings account, a money market account, a certificate of deposit, and/or other financial product. Different balance tiers may have corresponding interest rates tied to different financial products. For example, balance tier 304 may have an interest rate tied to a savings account while balance tier 306 may have an interest rate tied to a money market account.

At step 106, the financial institution 202 may monitor the balance of the DDA 210 to the proper balance tier for the DDA 210. It will be appreciated that the balance of the DDA 210 may fluctuate over time. Monitoring the balance of the DDA 210 may include checking the DDA 210 balance at pre-determined intervals, for example, every minute, every hour, every 12 hours, every day, or on a non-periodic basis. In various embodiments of the invention, the DDA 210 balance may be modified for the purpose of determining its balance tier based on other factors. The DDA 210 balance may be supplemented based on other financial products held by the depositor 208 with the financial institution 202. For example, the depositor 208 may hold a savings account, a certificate of deposit, or other financial product or products with the financial institution 202. A supplementary amount based on the balances of these other financial products may be aggregated together with the balance of the DDA 210 to determine which balance tier should apply to the DDA 210 balance. In certain embodiments, the supplementary amount may include all or only a portion of the depositor's 208 balances of other financial products (e.g., 50% of the depositor's 208 certificate of deposit balance).

The balance of the DDA 210 may be monitored by a computer system 202A associated with the financial institution 202, for example, that uses or accesses an interest module 202B. The interest module 202B may be implemented as software code, for example to be executed by a processor(s) of the computer system 202A using any type of suitable computer instruction type, such as, for example, Java, C, C++, Visual Basic, etc., using, for example, conventional or object-oriented techniques. The software code may be stored as a series of instructions or commands on a computer readable medium, such as a random access memory (RAM); a read only memory (ROM); a magnetic medium, such as a hard drive or floppy disk; an optical medium such as a CD or DVD-ROM or a flash memory card.

At step 108, the financial institution 202 may determine whether the total balance of the DDA 210 has transitioned or changed into a different balance tier (e.g., utilizing the computer system 202A and the interest module 202B). For example, with reference to FIG. 3, if the depositor 208 makes a deposit bringing the balance of the DDA 210 above $1,999.99, then the DDA 210 may transition from balance tier 302 to balance tier 304. If the DDA 210 has not transitioned into a different balance tier, then the financial institution 202 may continue to monitor the DDA 210 balance as described above at step 106.

If the DDA 210 has transitioned into a different balance tier, then the financial institution 202 (e.g., utilizing the computer system 202A and interest module 202B), may adjust the interest rate paid on the DDA's 210 balance to reflect the new balance tier. In various embodiments of the invention, the interest rate associated with a balance tier may be paid on the entire balance of the DDA 210. For example, with reference to FIG. 3, if the balance of the DDA 210 is between $2,000 and $9,999.99, then the interest rate corresponding to balance tier 304 may be applied to the total balance of the DDA 210. In certain embodiments, the interest rate associated with a balance tier may be paid on the portion of the DDA 210 balance falling within the balance tier. For example, again with reference to FIG. 3, if the balance of the DDA 210 is in the range of $2,000 to $9,999.99, then the interest rate corresponding to balance tier 304 may be applied only to the portion of the DDA 210 balance above $2,000. Interest may be paid on the remainder of the DDA 210 balance (e.g., the first $2,000 of the DDA 210 balance) at the rate corresponding to balance tier 302.

The depositor 208 may access the financial institution 202 to manipulate the DDA 210 according to a number of methods or systems. For example, the depositor 208 may wish to make a deposit to the DDA 210, make a withdrawal from the DDA 210, make a purchase by drawing on the DDA 210, or perform other transactions. The depositor 208 may access, view or manipulate the data associated with the DDA 210 by accessing the computer system 202A of the financial institution 202, for example. In certain embodiments, the depositor 208 may access the computer system 202A by traveling in person to a branch office, for example, of the financial institution 202.

In other non-limiting embodiments, the depositor 208 may access the computer system 202A of the financial institution 202 by a variety of user interfaces 206 including, for example and without limitation, a computer system 206A, a personal data assistant (PDA) or handheld computer 206B, a notebook 206C, or a wireless or wireline variety of telephone 206D. It can be appreciated that any user interface 206 capable of communicating data between the depositor 208 and the financial institution 202 and/or the computer system 202B may be employed within the scope of the invention. In addition, data may be communicated from the user interface 206 to the financial institution 202 through an appropriate communication medium or media 204 such as, without limitation, a wireless data network 204A, a wireline server 204B, and/or through a networked media or medium 204C, such as by an Internet or intranet connection.

It will be appreciated that embodiments of the present invention may offer potential benefits to both the depositor 208 and the financial institution 202. For example, the depositor 208 may earn an interest rate on funds deposited in the DDA 210 at an interest rate corresponding to a money market account or other investment account. The financial institution 202 may enjoy the increased stability of less liquid DDA 210 fund balances. For example, the interest paid to the depositor 208 may create an incentive for the depositor 208 to keep funds in the DDA 210, thus making the funds less liquid from the standpoint of the financial institution. The depositor 208 and financial institution 202 may enjoy these and other benefits without the information technology and other expenses involved with administering a sweep account as described above. One skilled in the art will appreciate these and other advantages of the present invention.

It is to be understood that the figures and descriptions of the present invention have been simplified to illustrate elements that are relevant for a clear understanding of the present invention, while eliminating, for purposes of clarity, other elements, such as, for example, details of DDA administration. Those of ordinary skill in the art will recognize that these and other elements may be desirable. However, because such elements are well known in the art, and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A method for adjusting a demand deposit account held at a financial institution by a depositor, the method comprising:
   structuring the demand deposit account with at least a first balance tier, a second balance tier, and a third balance tier;
   monitoring a balance of the demand deposit account by a computer system, wherein the computer system comprises at least one processor and operatively associated memory;
   determining, by the computer system, a supplementary amount, wherein the supplementary amount includes a portion of a balance of a certificate of deposit held at the financial institution by the depositor;
   accruing interest, by the computer system, from the financial institution to the balance of the demand deposit account at a first interest rate if the balance plus the supplementary amount falls within the first balance tier;
   accruing interest, by the computer system, from the financial institution to the balance of the demand deposit account at a second interest rate if the balance plus the supplementary amount falls within the second balance tier, wherein the second interest rate is equal to and tracks an interest rate paid by the financial institution on a savings account;
   accruing interest, by the computer system, from the financial institution to the balance of the demand deposit account at a third interest rate if the balance plus the supplementary amount falls within the third balance tier, wherein the third interest rate is equal to and tracks an interest rate paid by the financial institution on a money market account.

2. The method of claim 1, further comprising charging the depositor a monthly fee.

3. The method of claim 1, further comprising insuring the demand deposit account through the Federal Deposit Insurance Corporation (FDIC).

4. A system of adjusting a demand deposit account held at a financial institution by a depositor, the system comprising:
   a computer system comprising at least one processor and operatively associated electronic memory comprising instructions that, when executed by the at least one processor, cause the computer system to:
   structure a demand deposit account with at least a first balance tier, a second balance tier, and a third balance tier; and
   an interest module executed by the computer system, wherein the interest module is configured to:
   monitor a balance of the demand deposit account,
   determine a supplementary amount, wherein the supplementary amount includes a portion of a balance of a certificate of deposit held at the financial institution by the depositor,
   accrue interest from the financial institution to the balance of the demand deposit account at a first interest rate if the balance plus the supplementary amount falls within the first balance tier, and
   accrue interest from the financial institution to the balance of the demand deposit account at a second interest rate if the balance plus the supplementary amount falls within the second balance tier, wherein the second interest rate is equal to and tracks an interest rate paid by the financial institution on a savings account; and
   accrue interest from the financial institution to the balance of the demand deposit account at a third interest rate if the balance plus the supplementary amount falls within the third balance tier, wherein the third interest rate is equal to and tracks an interest rate paid by the financial institution on a money market account.

5. A computer-readable medium comprising instructions that when executed by a computer system, cause the computer system to perform the steps of:
   structuring the demand deposit account with at least a first balance tier, a second balance tier, and a third balance tier;
   monitoring a balance of the demand deposit account;
   determining a supplementary amount, wherein the supplementary amount includes a portion of a balance of a certificate of deposit held at the financial institution by the depositor;
   accruing interest from the financial institution to the balance of the demand deposit account at a first interest rate if the balance plus the supplementary amount falls within the first balance tier;
   accruing interest from the financial institution to the balance of the demand deposit account at a second interest rate if the balance plus the supplementary amount falls within the second balance tier, wherein the second interest rate is equal to and tracks an interest rate paid by the financial institution on a savings account; and
   accruing interest from the financial institution to the balance of the demand deposit account at a third interest rate if the balance plus the supplementary amount falls within the third balance tier, wherein the third interest rate is equal to and tracks an interest rate paid by the financial institution on a money market account, wherein the computer-readable medium is a physical memory storage device.

6. The method of claim 1, wherein the first interest rate is zero.

7. The system of claim 4, wherein the first interest rate is zero.

8. The method of claim 1, wherein the computer system comprises a single processor.

* * * * *